Patented July 3, 1934

1,965,008

UNITED STATES PATENT OFFICE 1,965,008

PROCESS OF PREPARING ALKOXY COMPOUNDS

Kurt Sponsel and Helmut Krauss, Frankfort-on-the-Main-Hochst, Germany, assignors to I. G. Farbenindustrie Aktiengesellschaft, Frankfort-on-the-Main, Germany No Drawing. Application March 13, 1931, Serial No. 522,509. In Germany March 18, 1930

4 Claims. (Cl. 260—9)

The present invention relates to a process of preparing alkoxy compounds.

We have found that alkoxy compounds can be prepared by causing an alkylene oxide in an aqueous weakly alkaline-solution to react upon a natural polymeric aliphatic amino compound. As compounds to be alkoxylated there may be used, for instance, glue, casein, albuminous substances. Care has to be taken that the alkaline reaction of the mixture is maintained during the reaction. The alkoxy compounds thus prepared which are easily and completely formed particularly in the case of highly polymeric substances, can be reduced in known manner so as to obtain alkyl compounds preferably by the treatment with hydrogen in the presence of platinum black or finely divided nickel.

The addition of water in the operation of alkoxylation with alkylene oxide involves the advantage that the reaction occurs much less violently than when there is no such addition and that the reaction may be carried out in open vessels. According to this process it is possible to avoid isomeric re-arrangements, the formation of polymerization products and other undesired secondary-reactions.

It was a surprising fact and could not be foreseen that the alkoxylation with alkylene oxides in aqueous alkaline solution would occur without any difficulty, because, as is known, ethylene oxide easily reacts under these conditions, while forming the corresponding glycols.

The following examples serve to illustrate the invention, but they are not intended to limit it thereto, the parts being by weight:

1. 1 part of casein is rubbed together with 6 parts of water and a wetting agent and the mixture is heated in a bomb at 80° C., so as to make a dispersion. After having added 2 parts of caustic soda solution of 8 per cent strength, the mixture is introduced into a kneading and mixing apparatus and 3 parts of ethylene oxide water of 40 to 50 per cent. strength are then added. The ethylene oxide is allowed slowly to act upon the casein at a temperature of 30° C.

The product obtained is suitable for emulsifying fats and waxes and is not decomposed by fermentation.

2. 100 parts of pulverized horn are suspended in 800 parts of water to which 5 parts of caustic soda solution of 40° Bé. have been added. Into this mixture ethylene oxide is introduced at a temperature between 70° C. and 80° C., while stirring, until a homogeneous solution is obtained. After neutralization, the solution is evaporated to dryness.

3. 100 parts of wool are heated with a solution of 200 parts of propylene oxide and 10 parts of caustic soda solution of 40° Bé. in 800 parts of water in a bomb to 60° C.-70° C., while stirring. The solution produced is further treated as described in Example 2.

We claim:

1. In the process of preparing alkoxy compounds, the step which consists in causing an alkylene oxide in an aqueous weakly alkaline solution to react upon a natural polymeric amino compound.

2. In the process of preparing alkoxy compounds, the step which consists in causing ethylene oxide in an aqueous weakly alkaline solution to react upon a natural polymeric amino compound.

3. In the process of preparing alkoxy compounds, the step which consists in causing an alkylene oxide in an aqueous weakly alkaline solution to react upon casein.

4. In the process of preparing alkoxy compounds, the step which consists in causing ethylene oxide in an aqueous weakly alkaline solution to react upon casein.

KURT SPONSEL.
HELMUT KRAUSS.